US010237918B2

(12) United States Patent
Adamson

(10) Patent No.: US 10,237,918 B2
(45) Date of Patent: Mar. 19, 2019

(54) APPARATUS FOR TEMPERATURE MEASUREMENT AND CONTROL USING TWO WIRES PER THERMAL ZONE AND METHODS OF USE

(71) Applicant: Adrian M. Adamson, Palo Alto, CA (US)

(72) Inventor: Adrian M. Adamson, Palo Alto, CA (US)

( * ) Notice: Subject to any disclaimer, the term of this patent is extended or adjusted under 35 U.S.C. 154(b) by 0 days.

(21) Appl. No.: 15/735,426

(22) PCT Filed: Jan. 5, 2016

(86) PCT No.: PCT/US2016/012216
§ 371 (c)(1),
(2) Date: Dec. 11, 2017

(87) PCT Pub. No.: WO2017/011030
PCT Pub. Date: Jan. 19, 2017

(65) Prior Publication Data
US 2018/0184486 A1 Jun. 28, 2018

Related U.S. Application Data

(60) Provisional application No. 62/193,042, filed on Jul. 15, 2015.

(51) Int. Cl.
*H05B 1/02* (2006.01)
*G08C 19/02* (2006.01)
(Continued)

(52) U.S. Cl.
CPC ............ *H05B 1/0288* (2013.01); *B64G 1/00* (2013.01); *G05D 23/1917* (2013.01);
(Continued)

(58) Field of Classification Search
CPC ........ H05B 1/0288; H05B 1/02; G05D 23/19; G05D 23/1917; B08C 19/02
(Continued)

(56) References Cited

U.S. PATENT DOCUMENTS 3,789,190 A 1/1974 Orosy et al.
3,869,597 A 3/1975 Strange
(Continued)

FOREIGN PATENT DOCUMENTS

KR 1020140128345 11/2014
WO 2013015610 1/2013

OTHER PUBLICATIONS

International Search Report for PCT/US2016/012216 from KIPO International Searching Authority, dated May 4, 2016 (3 pages).
(Continued)

*Primary Examiner* — Mark H Paschall
(74) *Attorney, Agent, or Firm* — Terrence M. Wyles, Esq.; Startup IP Law, LLC

(57) ABSTRACT

The present inventive disclosures are generally directed to an improved means to precisely measure temperature at a location remote from a central controller and a means to control heater and/or cooler power at that remote location with a temperature setpoint that is adjustable at the central-controller location, with a remote device/unit connected to the central controller using no more than two wires, employing specialized time-sliced alternating operating modes via those two wires in which high-accuracy current-based temperature readings are transmitted back to a central controller in one mode, and thermal-device power is provided in the other mode. The improved system is, as a result, both very cost-efficient and mass-efficient for controlling a multitude of thermal zones.

54 Claims, 4 Drawing Sheets

(51) Int. Cl.
    *G05D 23/19*     (2006.01)
    *B64G 1/00*     (2006.01)

(52) U.S. Cl.
    CPC ......... *G05D 23/1934* (2013.01); *G08C 19/02* (2013.01); *H05B 1/02* (2013.01)

(58) Field of Classification Search
    USPC .................................. 219/494, 497, 507, 483
    See application file for complete search history.

(56) References Cited

U.S. PATENT DOCUMENTS

| | | | |
|---|---|---|---|
| 4,086,466 A | | 4/1978 | Scharlack |
| 4,554,439 A | | 11/1985 | Cross et al. |
| 4,636,619 A | | 1/1987 | Sugimori |
| 5,723,848 A | * | 3/1998 | Bilenko ............. G05D 23/1932 219/483 |
| 5,763,858 A | * | 6/1998 | Jones ..................... B64D 15/22 219/213 |
| 6,449,574 B1 | * | 9/2002 | Eryurek ................. G01K 15/00 374/1 |
| 6,894,254 B2 | | 5/2005 | Hauschulz |
| 7,027,724 B2 | * | 4/2006 | Baxter ................. F24H 9/2021 392/441 |
| 8,541,716 B2 | | 9/2013 | Gu et al. |
| 2008/0054084 A1 | | 3/2008 | Olson |
| 2009/0160267 A1 | | 6/2009 | Kates |
| 2011/0301778 A1 | | 12/2011 | Liang et al. |
| 2013/0345892 A1 | | 12/2013 | Lin et al. |

OTHER PUBLICATIONS

International Preliminary Examination Report for PCT/US2016/012216 from KIPO International Preliminary Examination Authority, dated Oct. 24, 2017 (6 pages).

* cited by examiner

APPARATUS FOR TEMPERATURE MEASUREMENT AND CONTROL USING TWO WIRES PER THERMAL ZONE AND METHODS OF USE

CROSS-REFERENCE TO RELATED APPLICATIONS

This patent application claims the priority benefit of U.S. Patent Application No. 62/193,042, filed on Jul. 15, 2015 for "Temperature measurement and control using 2 wires per thermal zone", and incorporates by reference U.S. Patent Application No. 62/193,042 in its entirety herein for all purposes.

BACKGROUND

The inventive disclosure contained herein relates to various applications of temperature measurement and control via electric heaters (or in some cases cooling configurations) abound throughout all of industry, from consumer goods such as electric blankets to petrochemical processing, to spacecraft thermal control. These diverse applications are tied together by the need to measure a temperature and provide controlled electrical power for heating and/or cooling based on that temperature. A heater and/or cooler, temperature sensing device, and the thermally conductive structure connecting them can be referred to as a "thermal zone." In a thermal zone, a single temperature measured or used to control a heater is representative of the temperature of the zone as a whole.

The use of mechanical thermostats, such as snap-action bimetallic thermostats, is a common way to control the temperature of a thermal zone using only two wires between the zone and a power source. However, these suffer the drawback of a fixed, low-accuracy temperature setpoint, and provide no means for the user to monitor the temperature. Another type of two-wire solution that has many examples in the patent literature involves sensing a remote temperature by measuring the variation in resistance of the heating element. For example, see U.S. Pat. No. 3,789,190 to Orosy et al.; U.S. Pat. No. 3,869,597 to Strange; U.S. Pat. No. 4,086,466 to Scharlack; U.S. Pat. No. 4,554,439 to Cross et al.; and U.S. Pat. No. 4,636,619 to Sugimori. This approach suffers the drawbacks of poor accuracy due to biases caused by wiring/harness resistance, high/excessive power consumption during temperature measurement, limitations on the useful range of allowable heater resistance, and limitations on the heater material that can be used to those which significantly change resistance over the temperature range of interest. Because of the aforementioned difficulties with measurement accuracy, this approach is typically limited to applications in which an absolute temperature measurement is not necessary, and the heater setpoint can be selected with an in-situ calibration.

If a remote sensing and control application requires accurate absolute remote temperature monitoring through wires with significant resistance, and an electric heater, then four or more wires per thermal-control zone are typically necessarily needed, at least one pair of wires for the electrical heater power and at least two more wires to communicate the temperature-sensor readings. See, e.g., U.S. Pat. No. 6,894,254 to Hauschultz and U.S. Pat. No. 8,541,716 to Gu et al. The drawback with this approach is that using more than two wires between a central controller and its various remote thermal-control zones adds cost, size, and mass which is especially critical for mass-sensitive applications in aviation and aerospace.

Furthermore, another common issue in the present art is that regardless of whether two or more wires are used for the powering and temperature control of a system between a central controller and a remote zone, present solutions generally rely on voltage signals to communicate a parameter such as temperature from remote sensors. The problem with this is that as such sensors are more remote, the length of the wiring required becomes greater, which makes such signals more vulnerable to outside inductive forces to create interfering noise. In addition, the electrical resistance of longer wiring runs can also directly degrade the accuracy of the measurement, because the resistance of the wiring cannot be distinguished from the resistance of the sensor. While one solution to this is often shielded wiring, such a solution increases the cost and weight of the system, which is undesirable in many applications, especially in aerospace vehicles.

Consequently, there exists a need for a simplified temperature-control system to provide accurate temperature measurement from an electrically remote location that is unaffected by variations in harness resistance and undesired induced voltage-signal "noise" from extra-system sources, that reduces the overall system mass, and that can provide heater power to that electrically remote location, all by using no more than using only two wires to transmit power and temperature-sensor signals.

BRIEF SUMMARY

The present inventive disclosures are generally directed to an improved means to precisely measure temperature at a location remote from a central controller and a means to control heater and/or cooler power at that remote location with a temperature setpoint that is adjustable at the central-controller location, with a remote device/unit connected to the central controller using no more than two wires. The remote unit uses the level of the input voltage from the central controller to switch between communicating high-accuracy instrumentation signals from a temperature sensor disposed at the remote unit back to the central controller and passing power to the heater and/or cooler device at or in the remote unit. The temperature-sensing function provides higher accuracy than previous implementations of two-wire zones because its electrical signal is in the form of a controlled current, which is both unaffected by the wire resistance, and is relatively insensitive to background noise and/or biases from electromagnetic interference or thermoelectric effects.

This approach disconnects the heater or cooler during temperature sensing, which drastically reduces the power consumed during the remote temperature measurement. Such power-consumption reductions can be particularly important in certain applications where power-consumption budgets can have a significant impact on the designs of systems and equipment, as is often the case in many aerospace applications.

In typical embodiments of the present inventive disclosure, the required circuitry between a central controller and any associated remotely disposed thermal-control zones is greatly simplified, as reduced wiring and only a few parts are required per zone, which makes such an enhanced thermal-control system both very cost-efficient and mass-efficient for controlling a multitude of thermal zones.

The foregoing Brief Summary is intended to merely provide a short, general overview of the inventive disclosure described throughout this document, and therefore, is not intended to limit the scope of the inventive disclosure contained throughout the balance of this document, including its appended claims and drawings.

BRIEF DESCRIPTION OF THE DRAWINGS

FIG. 1D is very similar to FIG. 1A, except that the high-voltage source and low-voltage sources have been interchanged to support an embodiment wherein very low-voltage-rated heater/cooler device(s) at the remote units/thermal zones are to be powered.

DETAILED DESCRIPTION

I. Overview

Figure 1A:
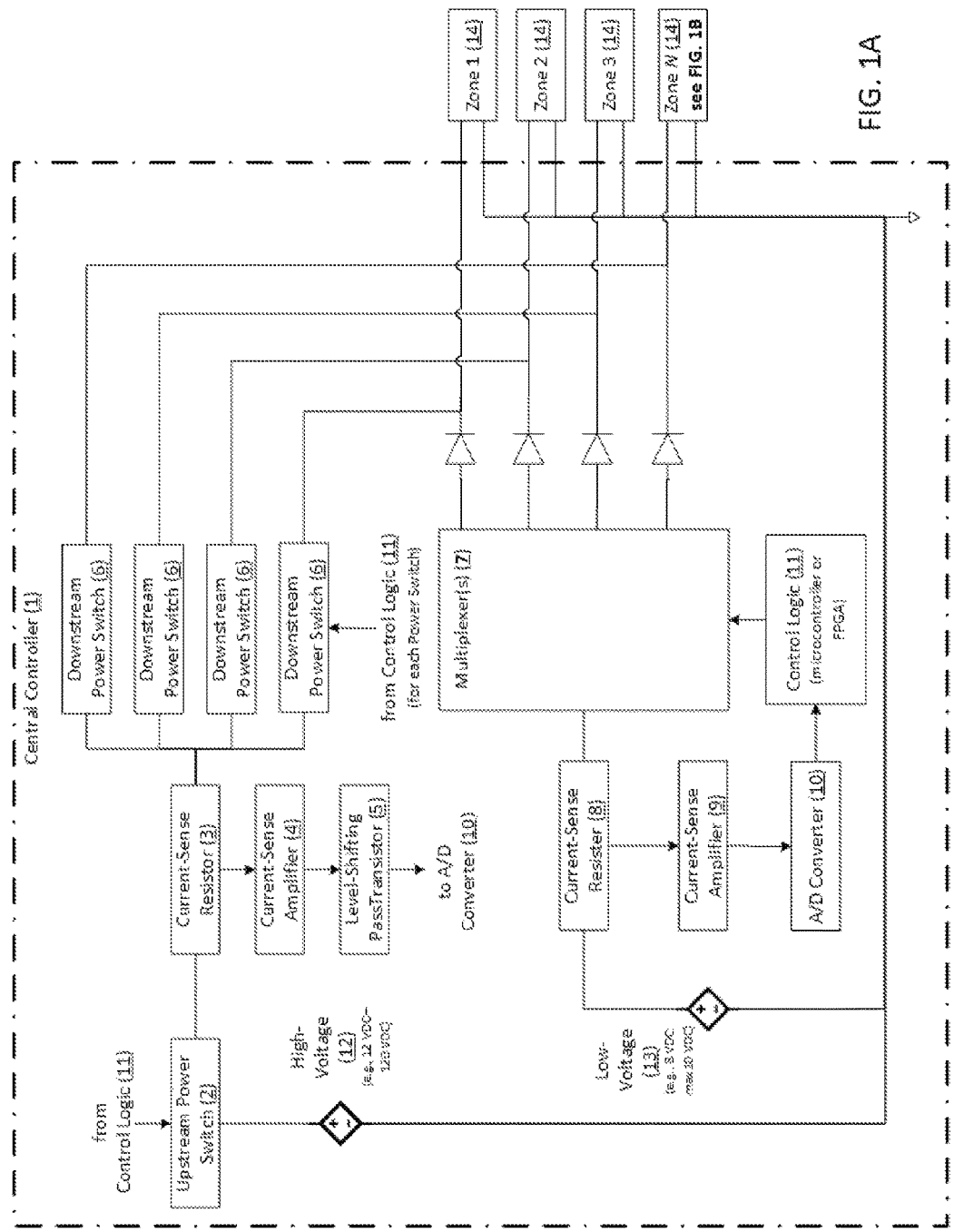
FIG. 1A depicts one embodiment of a simplified diagram of the internal functionality of a central controller used in an improved thermal-control system, and includes its relationships with one or more remote thermal-control zone devices/units.

The present inventive disclosures are generally directed to an improved means to precisely measure temperature at a location remote from a central controller and a means to control heater and/or cooler power at that remote location with a temperature setpoint that is adjustable at the central-controller location, with a remote device/unit connected to the central controller using no more than two wires. The remote unit uses the level of the input voltage from the central controller to switch between communicating high-accuracy instrumentation signals from a temperature sensor disposed at the remote unit back to the central controller and passing power to the heater and/or cooler device at or in the remote unit. The temperature-sensing function provides higher accuracy than previous implementations of two-wire zones because its electrical signal is in the form of a controlled current, which is both unaffected by the wire resistance, and is relatively insensitive to background noise and/or biases from electromagnetic interference or thermoelectric effects.

This approach disconnects the heater or cooler during temperature sensing, which drastically reduces the power consumed during the remote temperature measurement. Such power-consumption reductions can be particularly important in certain applications where power-consumption budgets can have a significant impact on the designs of systems and equipment, as is often the case in many aerospace applications.

In typical embodiments of the present inventive disclosure, the required circuitry between a central controller and any associated remotely disposed thermal-control zones is greatly simplified, as reduced wiring and only a few parts are required per zone, which makes such an enhanced thermal-control system both very cost-efficient and mass-efficient for controlling a multitude of thermal zones.

II. Terminology

The terms and phrases as indicated in quotes (" ") in this section are intended to have the meaning ascribed to them in this Terminology section applied to them throughout this document, including the claims, unless clearly indicated otherwise in context. Further, as applicable, the stated definitions are to apply, regardless of the word or phrase's case, to the singular and plural variations of the defined word or phrase.

The term "or", as used in this specification and the appended claims, is not meant to be exclusive; rather, the term is inclusive, meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of the phrase "in one embodiment" and/or "in one variation" and similar phrases in various places in the specification are not necessarily all meant to refer to the same embodiment.

The term "couple" or "coupled", as used in this specification and the appended claims, refers to either an indirect or a direct connection between the identified elements, components, or objects. Often the manner of the coupling will be related specifically to the manner in which the two coupled elements interact.

The term "removable", "removably coupled", "readily removable", "readily detachable", "detachably coupled", and similar terms, as used in this patent application specification (including the claims and drawings), refer to structures that can be uncoupled from an adjoining structure with relative ease (i.e., non-destructively and without a complicated or time-consuming process) and that can also be readily reattached or coupled to the previously adjoining structure.

Directional and/or relational terms such as, but not limited to, left, right, nadir, apex, top, bottom, vertical, horizontal, back, front, and lateral are relative to each other, are dependent on the specific orientation of an applicable element or article, are used accordingly herein to aid in the description of the various embodiments, and are not necessarily intended to be construed as limiting in this specification and the appended claims.

As applicable, the terms "about" or "generally", as used herein unless otherwise indicated, means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "thermal device", as used in this specification and the appended claims, refers to either a heater device or a cooling device or a device that can both provide heating and cooling.

Figure 1B:
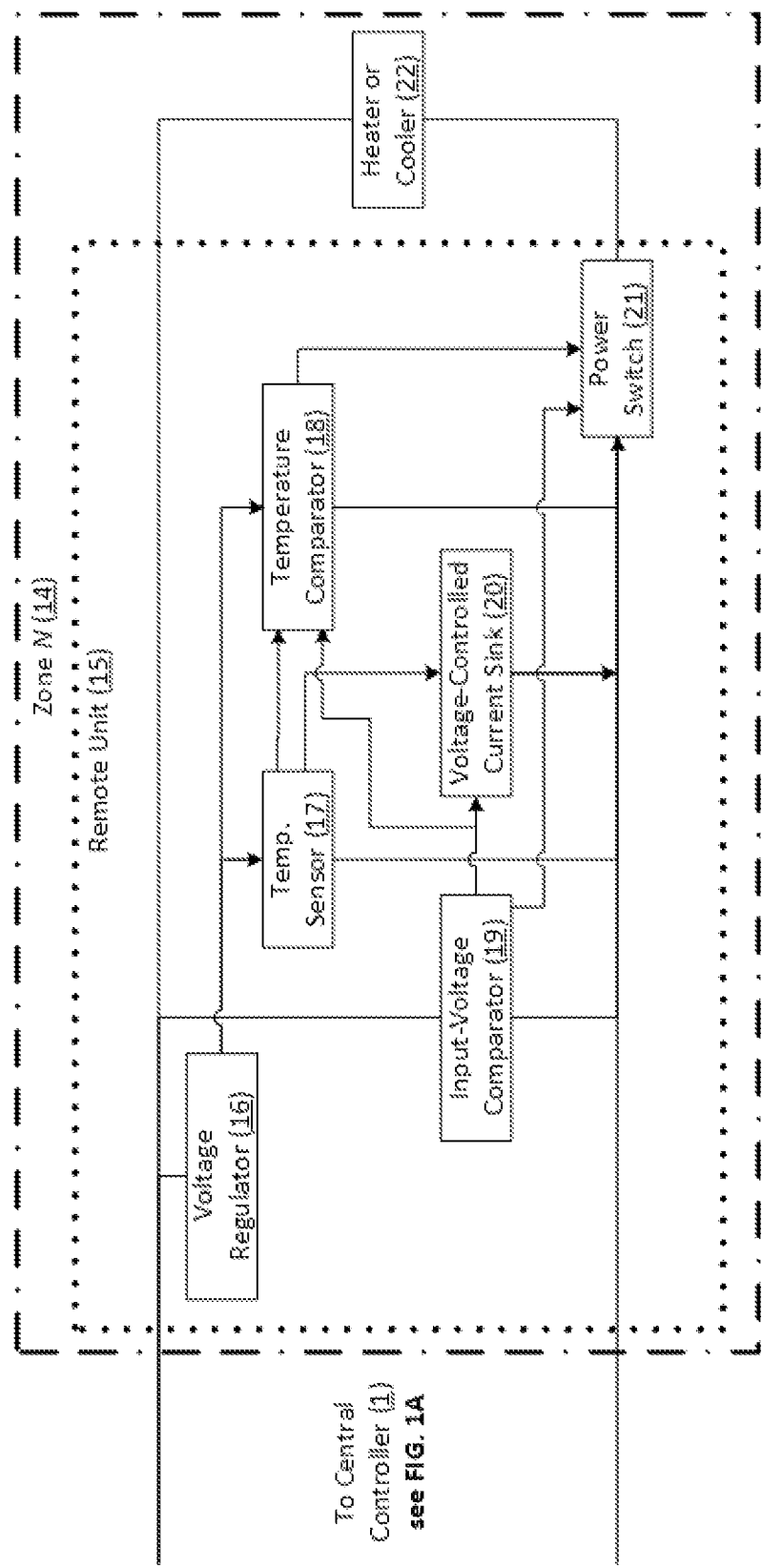
FIG. 1B depicts one embodiment of a simplified diagram of the internal functionality of a remote thermal-control zone device/unit used in conjunction with a central controller, such as that depicted in FIG. 1A, in an improved thermal-control system.
Figure 1C:
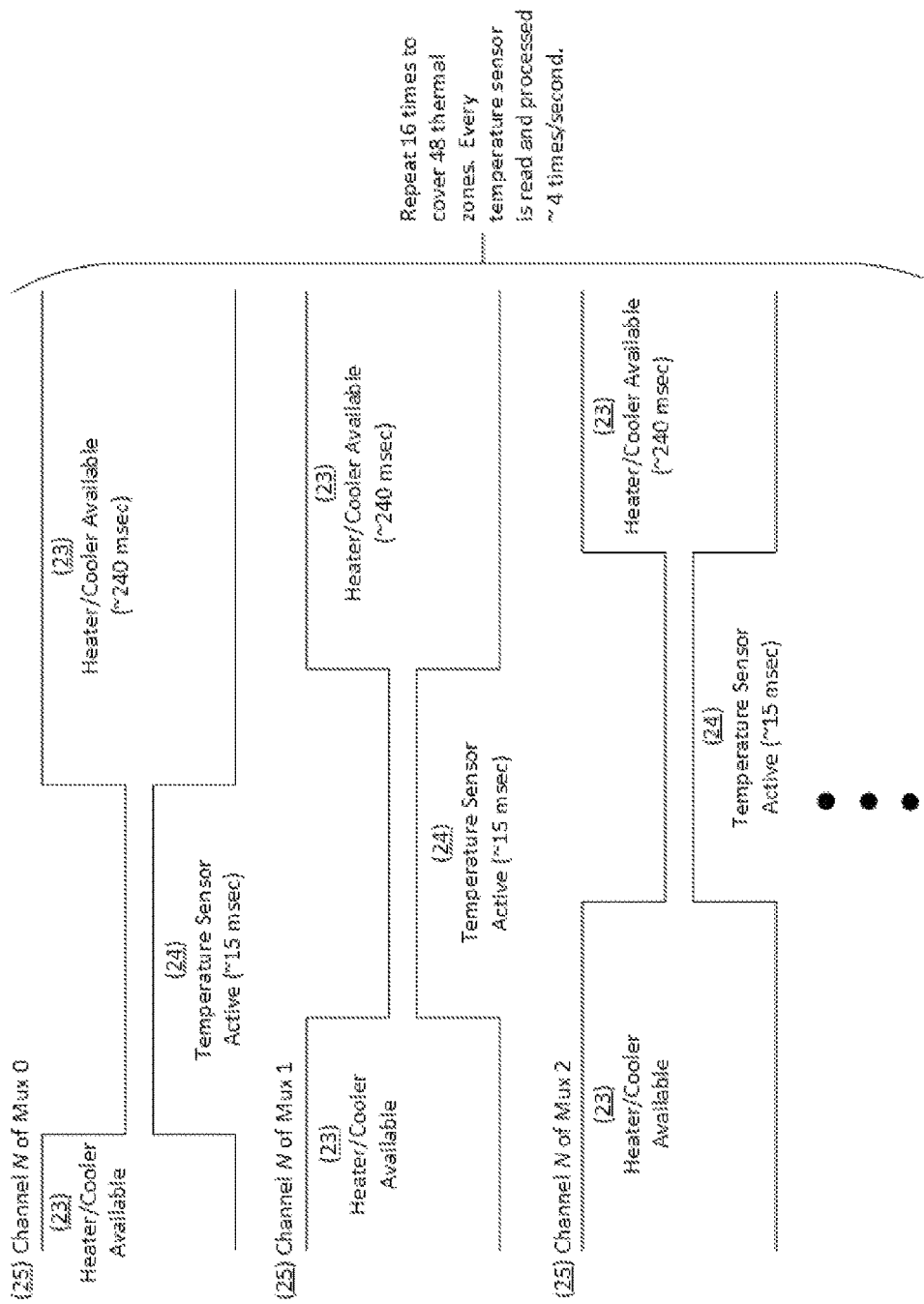
FIG. 1C depicts one embodiment of a set of example operations profiles for four channels from a multiplexor (as such depicted in FIG. 1A), with each channel showing a set of two square-wave profiles versus time to show the time-slicing used to control the enablement of making power available to a remote heater/cooler from a central controller and the enablement of transmission of temperature-sensor signals from remote units in thermal-control zones to a central controller. Typically, the amount of time allocated for powering heater/cooler operations is many times greater than the allocated time slices used to enable the transmission of temperature-sensor readings to the central controller. In the embodiment depicted in FIG. 1C, the heater/cooler operations are allocated a period of about 240 msec before the temperature-sensor signal transmissions are allocated a period of about 15 msec.

III. An Improved System for Temperature-Monitoring and Power Control for Heating and/or Cooling Refer to FIGS. 1A-1C. This Section III is generally directed to an improved means to precisely measure temperature at one or more locations 14 remote from a central controller 1 and a means to control heater 22 and/or cooler 22 power at each remote location 14 with a temperature setpoint that is adjustable at the central-controller location, with a remote device/unit 15 connected to the central controller 1 using no more than two wires. For simplicity, most of the discussion in this Section III is primarily directed to the control of a remotely located heater; however, one ordinarily skilled in the art will appreciate the fact that the principles discussed can be applied to systems for remotely controlling cooling devices as well.

In an embodiment, the remote unit 15 uses a voltage regulator 16 to reduce a wide range of input voltages to levels compatible with other components within the remote unit 15. In this embodiment, an input-voltage comparator 19 with a built-in reference provides a digital-logic signal to the rest of the circuitry according to whether the input voltage is above or below a preset voltage, called the mode-threshold voltage, which in one preferred embodiment is set at a value of 10 VDC. When the input voltage is at or below the mode-threshold voltage, the remote unit 15 turns off its heater/cooler power switch 21 and shifts the mode of operation of the remote unit 15 to temperature-sensing and uses a voltage-output temperature transducer/sensor 17 together with a voltage-to-current converter circuit 20 (referred to here as a current sink), to consume current as a function of temperature. The current sink 20 circuit in this embodiment of the remote unit 15 uses an operational amplifier with current feedback to ensure that the current consumed at the remote unit 15 is a function only of temperature and is unaffected by resistance or changes in resistance of the wire connecting the remote unit 15 to the central controller 1. In variations, the temperature sensor 17 is a Model AD590, a two-terminal integrated-circuit temperature transducer available from Analog Devices, Inc.

In some embodiments of the remote unit 15, when the central controller 1 provides a voltage higher than the mode-threshold voltage (in some preferred variations, this mode-threshold voltage is 10 VDC), the remote unit 15 prepares to energize the heater 22 by turning off the current sink 20 and turning on a temperature comparator 18 that compares the temperature sensor 17 voltage output to a fixed reference voltage that corresponds to an over-temperature condition. If the temperature is below the over-temperature condition, then the temperature comparator 18 turns on a field-effect transistor (FET) to allow current to pass through the heater 22. Conversely, in systems adapted to control a cooler 22, when the central controller 1 provides a voltage higher than the mode-threshold voltage (in some preferred variations, this mode-threshold voltage is 10 VDC), the remote unit 15 prepares to energize the cooler 22 by turning off the current sink 20 and turning on a temperature comparator 18 that compares the temperature sensor 17 voltage output to a fixed reference voltage that corresponds to an under-temperature condition. If the temperature is above the under-temperature condition, then the temperature comparator 18 turns on a field-effect transistor (FET) to allow current to pass through the cooler 22.

In some variations of heater 22 control, the setpoint of the over-temperature-cutoff comparator 18 is set high-enough so that it is only active during a fault and the normal operational range of the temperature control can be adjusted remotely by switching power to the remote unit 15 on or off during heater/cooler-available time windows 23 in the central controller 1, which itself in some embodiments can be controlled remotely. See example time-slice diagrams in FIG. 1C, which depict example multiplexor 7 channels 25 and associated heater/cooler on-times 23 alternating with temperature-sensor on-times 24.

In additional embodiments, the central controller 1 comprises one or more multiplexers 7 that are responsible for providing a low-voltage (e.g., 5-8 VDC, and no more than 10 VDC) to selected remote zones 14 in order to signal a remote unit 15 to shift to a temperature-sensing mode for the two-wire bus between the remote unit 15 and the central controller 1. Each multiplexor 7 is in data and power communication with one or more channels 25 (or remote zones 14). In a typical application, three 16-channel multiplexers 7 are used in a central controller 1, for a total of 48 channels to be controlled. The control-logic module 11, discussed more in detail infra, causes the operational-mode cycling through all of the channels 25 (that is, remote zones 14) of the multiplexers 7 of the central controller 1.

In alternative embodiments, the over-temperature or under-temperature cutoff function of the temperature comparator 18 can allow the remote unit 15 to act as a stand-alone thermostat with a high-precision setpoint. In one variation, the central controller 1 can measure the temperature and control the heater/cooler 22 for multiple zones 14 with a minimum of circuitry, by means of one or more multiplexers 7 that selects one zone 14 at a time for temperature measurement. A zone 14 is selected for measurement by means of a multiplexer 7 that outputs a low voltage (e.g., 5 VDC-8 VDC) onto the connecting wires and a remote-unit power switch 21 that turns off the high-voltage 12 (e.g., 12 VDC-120 VDC; in some embodiments, nominally 36 VDC) heater/cooler 22 power output for that zone 14. In many variations, the coordination of the multiplexer 7 switching 2, 6 and the heater/cooler power switching 21 is accomplished by means of control logic 11 which could be embodied in a microcontroller or a Field-Programmable Gate Array (FPGA). For optimum performance, the central controller 1 is configured/programmed to put a zone 14 into the temperature-sensing mode for only as long as necessary to make the temperature reading, typically a small fraction of a second (e.g., ~15 msec), and either remove all power for the heater/cooler 22 from the zone 14 or apply full heater/cooler 22 power to the zone 14 as appropriate for the remainder of the cycle, which is relatively long (e.g., ~240 msec) as compared to the temperature-sensing mode.

In an embodiment, the central controller 1 can output the temperature measurement and heater/cooler 22 status by means of a display to the operator or communication over a serial interface or radio link to another system monitored by an operator.

In still more embodiments, the central controller 1 includes a current sensor 3 with an associated amplifier 4 and level-shifting pass transistor 5 for one or more heater/cooler 22 power circuits, monitored by the control-logic device 10 so that the heater/cooler power switch 2 can be opened in the event of an over-current fault such as a short-circuit or other failure within the remote unit 15.

In many embodiments, the control-logic module 11 for the system is provided using a microcontroller or Field-Programmable Gate Arrays (FPGA), though those skilled in the art would immediately appreciate that numerous alternative control-logic-implementation devices known in the art can also be used; e.g., Application-Specific Integrated Circuits (APIC), etc. Similarly, various algorithms can be employed by those skilled in the art to cycle through each channel 25 (that is, each remote zone 14) of each multiplexer 7 within a central controller 1 in order to cause each remote unit 15 to alternate its operational modes between temperature sensing and the enablement of heater/cooler 22 operations, though one preferred effective specific algorithm is described, infra.

In an embodiment, for each channel 25, the multiplexer 7 sets up the channel 25/remote zone 14 by switching off the associated downstream power switch 6, which in turn shuts off the power for the heater/cooler 22 in the remote unit 15 and then causes the multiplexer 7 to send the temperature-sensing low-voltage power signal (typically ~8 VDC) to the channel 25/remote unit 15, and the input-voltage comparator 18 detects the applied voltage and compares it to the preset over-voltage threshold value (in some variations, this threshold is set for greater than 10 VDC). Because the applied voltage at this point is less than or equal to the preset over-voltage threshold value, the remote unit 15 causes the voltage-controlled current sink 20 to activate and bypass the heater/cooler power switch 21 (which is turned off at this point). The voltage-controlled current sink 20 ensures that a consistent current signal proportional to the sensed temperature 17 is transmitted back to the central controller 1 via the multiplexer 7, to be further processed by the current-sense resistor 8, the current-sense amplifier 9, the analogue-to-digital (A/D) converter 10, and back to the control-logic module 11. The temperature for the remote zone 14/channel 25 is read and averaged/filtered to reduce errors many times during each temperature-sensing mode 23 (e.g., in one embodiment, 300 times in a roughly 15 msec period), then converted to a value in appropriate temperature units for the sensor and analog circuitry (e.g., most commonly to degrees Celsius, though other units could be used). Once the temperature-sensing mode 23 completes, the multiplexor 7 stops applying the low-voltage 13 to the remote unit 15/channel 25, and instead makes the high-voltage 12 available to the remote unit 15/channel 25 to enable potential heater/cooler 22 operations.

For heater 22 operations, if the measured temperature 17 is below a predefined low setpoint ("LOW_SETPOINT"), then the downstream power switch 6 is turned on to supply high-voltage 12 (e.g., 12 VDC-120 VDC; in some embodiments, nominally 36 VDC) to the remote unit 15. This in turn will cause the remote unit 15 to sense the high-voltage input and enable its power switch 21 to be turned on and turning off the current sink 20, if the temperature comparator 18 determines that the temperature sensor 17 voltage is below a predefined over-temperature condition, which will turn on the heater power switch 21 and energize the heater 22. Conversely, for cooler 22 operations, the same process within the remote unit 15 occurs, except that the temperature comparison is made to a high setpoint ("HIGH_SETPOINT"), above which the cooler 22 will be energized.

As just one example of the implementation of control logic 11, the following algorithm deliberately builds-in some slight processing inefficiencies as the array of multiplexers 7 and channels 25 (/remote zones 14) are iterated through in order to allow for enough time for each channel 25 to reach steady state between the heater/cooler 22 operations temperature-sensing mode 24. (See FIG. 1C for diagrams of examples of the timing relationships of the operational-modes for channels 25.) For example, each channel 25 is iterated through in an "outer" logic loop, with each multiplexer 7 being iterated through in an "inner" logic loop; e.g., Channel "1" for each multiplexer 7 is resolved before Channel "2" for each multiplexer 7 is resolved, and the setup sub-process of multiplexers 7 are iterated through by setting up each multiplexer 7 two cycles before the multiplexer's 7 connected remote unit 15 is measured (assuming three or more multiplexers 7). The following algorithm assumes, for example purposes only, that a central controller 1 contains three 16-channel multiplexers 7, and that each channel 25 of the multiplexers 7 serves a discrete remote zone 14, for a total of 48 channels 25.

Control-Logic Example Algorithm Pseudocode

1. Outer Loop: Cycle through 16 channels 25 of each multiplexer 7:
   a. Inner Loop: Cycle through each of three multiplexers 7 (Mux[M]) for the currently indexed channel 25 from the array of 16 channels 25 in Mux(M):
      (1) Set up Channel N of Mux(M+2) to prepare for the temperature-sensing mode 24 (NOTE: "Mux[M+2]" refers to iterating by 2 for the next loop; that is, Mux[0], Mux[2], Mux[1], Mux[0], etc.):
         (i) Store the present heater/cooler switch 21 state for Zone(N, M+2) as PREVIOUS_HEATER_SWITCH_STATE;
         (ii) Turn off the heater 22 for Zone(N, M+2); and
         (iii) Turn on the low-voltage 13 output of Mux(M+2) to initiate the temperature-sensing mode 24.
      (2) Read the temperature at Zone(N, M) a plurality of times, filtering and averaging the readings to reduce "noise":
         (i) Initialize FILTERED_VALUE with previous temperature reading;
         (ii) Loop through the plurality of temperature readings 300 times {
            a. new_value=read(analogue_value);
            b. FILTERED_VALUE=FILTERED_VALUE+ ([new_value−FILTERED_VALUE]/filter_gain)}//end loop; and
         (iii) Convert FILTERED_VALUE to temperature units appropriate for the sensor and analog circuitry (e.g., most commonly to degrees Celsius, though other units could be used).
      (3) Set the central controller output voltage to Zone(N, M):
         (i) If FILTERED_VALUE<LOW_SETPOINT, then turn on downstream power switch 6 for Zone(N, M);
         (ii) Else, if FILTERED_VALUE>HIGH_SETPOINT, then turn off downstream power switch 6 for Zone(N, M);
         (iii) Else, set the downstream power switch 6 for Zone(N, M) to PREVIOUS_HEATER_SWITCH_STATE.
      (4) Check for over-current condition on downstream power switch 6 for Zone(N, M):
         (i) Read the analog-to-digital (A/D) converter 10 value (as processed via a current-sense resistor 3, a current-sense amplifier 4, and level-shifting pass transistor 5) representing the current for Zone(N, M);

(ii) Convert the A/D converter 10 value to current units (i.e., Amps); and (iii) If the current>a predetermined OVER-CURRENT_THRESHOLD, then turn off the upstream power switch 2.

2. END Algorithm

Figure 1D:
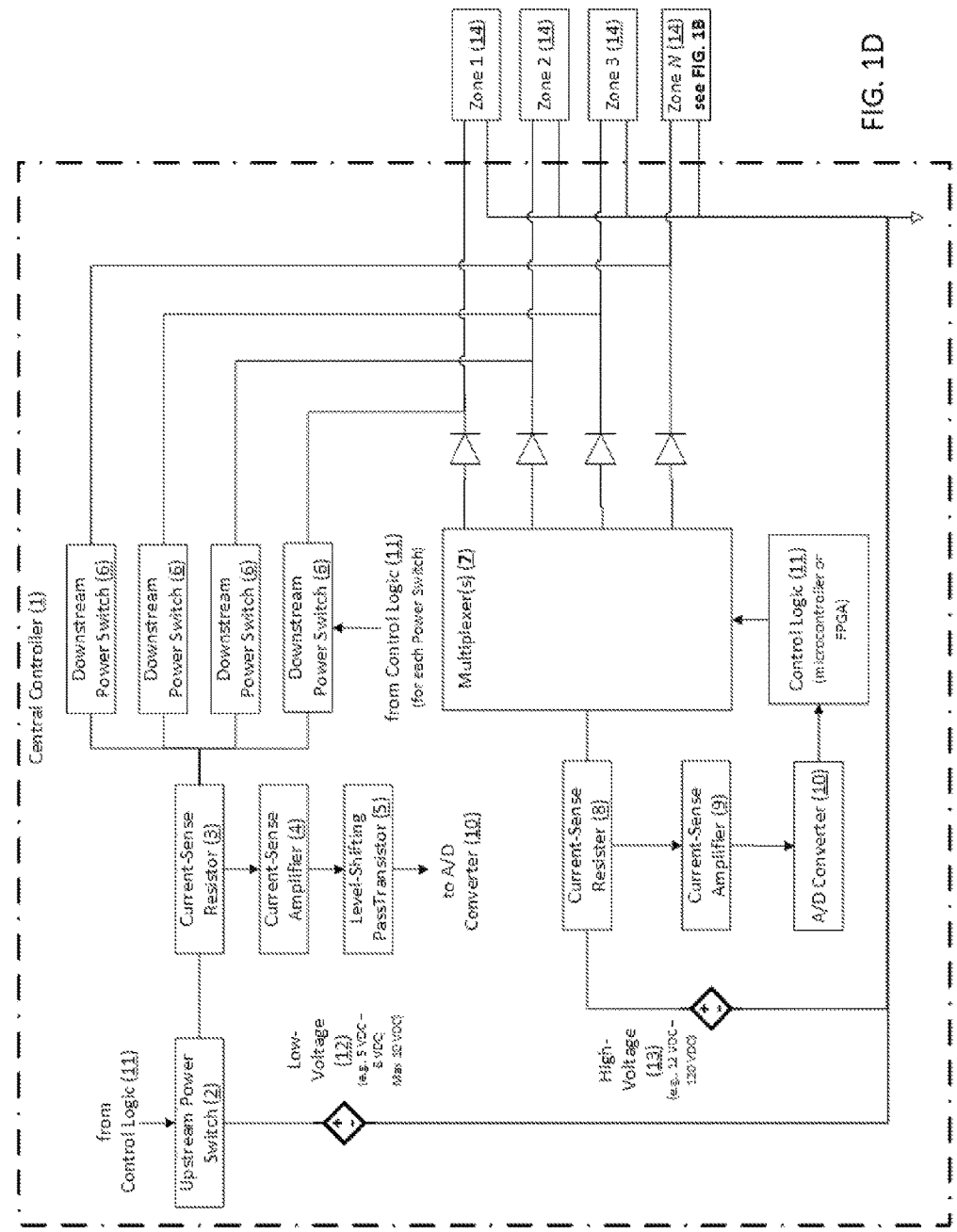
FIG. 1D depicts one alternate embodiment of a simplified diagram of the internal functionality of a central controller used in an improved thermal-control system, and includes its relationships with one or more remote thermal-control zone devices/units. This

In the foregoing described embodiments and variations, the control schema for the time-slicing between the heater/cooler-availability mode 23 temperature-sensing mode 24 is based on the applied voltage from the central controller 1 to a remote unit 15 exceeding a mode-threshold voltage in order to enable the powering 23 of an associated heater/cooler 22, wherein the applied voltage is at or below the mode-threshold voltage, the temperature-sensing mode 24 is entered. However, those skilled in the art would appreciate the fact that this typical operational schema can be deviated from in other applications. For example, referring to FIG. 1D, in an alternate application, each remote unit 15 is associated with a discrete instrument that may require a low-power/low-voltage (e.g., 5 W at about 5 VDC) heating capability. Such an application might be used in some spacecraft that has a plurality of small instruments and/or cameras installed in various points in and/or around the spacecraft, and each instrument/camera is in thermal communication with a low-power heating element (e.g., 5 W at about 5 VDC). In such applications, the control logic 11 in the central controller 1 and the remote unit 15 configuration is modified such that when the mode-threshold voltage drops to or below a pre-determined value (e.g., 5-10 VDC) the remote unit 15 is switched to a heater/cooler 22 availability mode 23 and conversely, when the predetermined mode-threshold voltage is exceeded, the remote unit 15 switches to a temperature-sensing mode 24.

IV. A Mass-Reduction-Optimized Spacecraft Using an Improved System for Temperature-Monitoring and Power Control for Heating and/or Cooling Refer to FIGS. 1A-1C. This Section IV is generally directed to a practical applications of an improved thermal-control system that includes a means to precisely measure temperature at a location remote from a central controller 1 and a means to control heater 22 and/or cooler 22 power at that remote location with a temperature setpoint that is adjustable at the central-controller location, with a remote device/unit 15 connected to the central controller 1 using no more than two wires, whereby the use of such a system also translates into minimizing the mass required to incorporate into the parent system, such as a spacecraft. The reduction of this mass requirement, in turn, improves the mass margin available to designers to incorporate other systems/instrument packages. This Section IV incorporates and builds on the teachings of Section III.

In embodiments, one or more improved thermal-control systems of Section III are incorporated into a spacecraft with a plurality of thermal-control zones 14 that are managed/controlled by a central controller 1. In variations, the central controller 1 of each system is itself controlled and monitored from a second remote station in communication (electrical, optical/laser, and/or radio) with the central controller 1. Said second remote station can also facilitate the remote management and setting of system setpoints for thermal zone 14 temperature control or for upstream switch 2 over-current limit within the central controller 1 and/or within the plurality of remote units 15 in the thermal-control zones 14. In other embodiments, each central controller 1 can service up to 48 remote thermal-control zones 14 and heaters 22 using software-controlled, adjustable setpoints.

In an embodiment, more than four times per second, the central controller 1 briefly applies a low voltage (e.g., 5 VDC-8 VDC) to each remote unit 15, which in turn responds with a precise analog temperature reading from its temperature sensor 17, which is communicated back to the central controller via a proportional controlled current. In variations, for approximately 94% of the control cycle, the remote unit 15 of each thermal-control zone 14 is available to pass-through high voltage (e.g., 12 VDC-120 VDC; with some embodiments using a nominal value of 36 VDC) heater 22 power as needed for precise temperature control. A separate built-in thermostat 17, 18 also provides for local over-temperature fault protection.

In some applications, the features and specifications for a spacecraft-implemented improved thermal-control system include:

Central Controller 1:

Able to manage/control up to 48 thermal-control zones 14 with a single printed circuit card whose main surface-area dimensions are only about 3-in.×5-in.;

Configurable with 16-channel 25 or 32-channel 25 multiplexers 7;

Compatible with heater devices 22 rated at voltages from 12 VDC to at least 120 VDC;

Capable of supporting a total power throughput of over 2000 W;

Has one upstream power switch 2 per every four thermal-control zones 14, which provides protective circuit-breaker functionality and power telemetry;

Downstream power switches 6 are rated to be able to provide up to 2 Amps;

Central controller 1 software can command any heater 22 on or off based on any combination of temperature-sensor 17 readings;

The setpoints for heater 22 operations can be adjusted in-flight;

Uses radiation-hardened FETs that have been tested with heavy ions beyond 87 MeV, with no single-event gate rupture;

Provides 16-bit measurements with approximately 0.5 deg. C. end-to-end accuracy; and The heater 22 commands and thermal-zone 14 temperature telemetry are communicated via a universal asynchronous transmitter (UART) over RS-422-standard (aka TIA/EIA-422 standard) twisted-pair cables; however, other protocols known in the art can be used.

Remote Unit 15:

Hermetic package footprint is only 0.5-in.×0.3-in., which is small-enough for adhesive installation, similar to the installation of a temperature sensor;

Has a operating temperature range of −55 deg. C. to 150 deg. C.;

Compatible with heater devices 22 rated at voltages from 12 VDC to at least 120 VDC;

Rated for a maximum current of 2 Amps, allowing for up to 240 W of power on a single channel;

Has a built-in, independent local over-temperature thermostat for fault tolerance;

High-precision temperature-sensor measurements are transmitted via analog current, eliminating errors from harness resistance and/or induced voltage signals from external sources; and Can be used to replace a mechanical thermostat, a temperature sensor, or both.

For larger spacecraft applications, the improved thermal-control system can typically save at least 1 lbm per thermal-control zone 14 because of the halving of the number of wires required between the central controller 1 and a remote unit 15. The central controller 1 also is typically equipped with the latest technology to provide high-power throughput, comprehensive telemetry, and fault protection within a very small size as compared to other solutions in the art.

The improved thermal-control system can support more thermal-control zones 14 for the same mass in alternative systems in the art, which allows for finer thermal control in discrete regions of the spacecraft, which in turn reduces heater 22 power requirements. In addition, high-accuracy temperature-sensing allows for the use of lower setpoints to reduce thermal losses, and thus save power that would otherwise be used in heater 22 operations. Moreover, the improved thermal-control system improves spacecraft reliability because it allows for in-flight-adjustable setpoints that provide adaptability in the event of unexpected situations that can save missions.

In the foregoing described embodiments and variations, the control schema for the time-slicing between the heater/cooler-availability mode 23 temperature-sensing mode 24 is based on the applied voltage from the central controller 1 to a remote unit 15 exceeding a mode-threshold voltage in order to enable the powering 23 of an associated heater/cooler 22, wherein the applied voltage is at or below the mode-threshold voltage, the temperature-sensing mode 24 is entered. However, those skilled in the art would appreciate the fact that this typical operational schema can be deviated from in other applications. For example, referring to FIG. 1D, in an alternate application, each remote unit 15 is associated with a discrete instrument that may require a low-power/low-voltage (e.g., 5 W at about 5 VDC) heating capability. Such an application might be used in some spacecraft that has a plurality of small instruments and/or cameras installed in various points in and/or around the spacecraft, and each instrument/camera is in thermal communication with a low-power heating element (e.g., 5 W at about 5 VDC). In such applications, the control logic 11 in the central controller 1 and the remote unit 15 configuration is modified such that when the mode-threshold voltage drops to or below a pre-determined value (e.g., 5-10 VDC) the remote unit 15 is switched to a heater/cooler 22 availability mode 23 and conversely, when the predetermined mode-threshold voltage is exceeded, the remote unit 15 switches to a temperature-sensing mode 24.

The various disclosed embodiments of the present improved thermal-control system is especially well-suited for spacecraft applications, in which the reduction of the required system mass is especially valuable. However, those skilled in the art will appreciate that the simplified schema of the system and the great minimization of erroneous temperature readings by way of sending constant-current signals based on highly filtered temperature-sensor readings is very desirable in myriad other applications.

V. An Improved Thermal-Control System for Temperature-Monitoring and Power Control of Thermal Devices Refer to FIGS. 1A-1C. This Section V is generally directed to an improved thermal-control system to precisely measure temperature at one or more locations 14 remote from a central controller 1 and a means to control heater 22 and/or cooler 22 power at each remote location 14 with a temperature setpoint that is adjustable at the central-controller location, with a remote device/unit 15 connected to the central controller 1 using no more than two wires.

In an embodiment, the improved thermal-control system comprises a central controller 1, comprising at least one multiplexing device 7, a low-voltage power source 13, and a high-voltage power source 12 and at least one remote unit 15 for installation in discrete thermal-control zones 14 remotely located from the central controller 1. In variations, the at least one remote unit 15 is in electrical communication with the central controller 1 via at least one channel 25 of the central controller's 1 at least one multiplexing device 7, the at least one remote unit's 15 electrical communication with the central controller 1 is accomplished using no more than two wires, the at least one remote unit 15 comprises a temperature sensor 17 and a temperature-controlled constant-current source (also called a voltage-controlled current sink) 20, and the at least one remote unit 15 contains thermal-device-powering circuitry to selectively apply power to a thermal device 22. In such embodiments, the central controller 1 is adapted to selectively apply either high-voltage power 12 (in variations, between 12 VDC to at least 120 VDC) or low-voltage power 13 (in variations, 5 VDC to 8 VDC) to the at least one remote unit 15; and when the central controller 1 applies low-voltage power 13 to the at least one remote unit 15, the at least one remote unit 15 operates in temperature-sensing mode 24 and communicates a current-based temperature-reading signal to the central controller 1; and when the central controller 1 applies high-voltage power 12 (in variations, between 12 VDC to at least 120 VDC) to the at least one remote unit 15, the at least one remote unit 15 operates in thermal-device-powering mode 23 to make power available for a thermal device 22 in electrical communication with the at least one remote unit 15.

In additional embodiments, the at least one remote unit 15 operates in a temperature-sensing mode 24 when the applied voltage 13 from the central controller 1 is equal to or less than a predetermined mode-threshold voltage (in variations, this value is 10 VDC+/−1 VDC), and operates in a thermal-control-device-power-availability mode 23 when the applied voltage (in variations, 5 VDC to 8 VDC) 13 from the central controller 1 is greater than a predetermined mode-threshold voltage.

In still more embodiments, the thermal device 22 is a heater device and the at least one remote unit 15 further comprises a temperature comparator 18, the temperature comparator 18 in communication with the temperature sensor 17 and programmed with a predetermined setpoint for an over-temperature condition; and a thermal-device power switch 21 in communication with the temperature comparator 18; wherein if the sensed temperature from the temperature sensor 17 is below the over-temperature-condition setpoint, then the temperature comparator 18 will enable the thermal-device power switch 21 to switch on to make high-voltage power 12 available to the heater device 22.

In some embodiments, the thermal device 22 is a cooling device and the at least one remote unit 15 further comprises a temperature comparator 18, the temperature comparator 18 in communication with the temperature sensor 17 and programmed with a predetermined setpoint for an under-temperature condition; and a thermal-device power switch 21 in communication with the temperature comparator 18; wherein if the sensed temperature from the temperature sensor 17 is above the under-temperature-condition setpoint, then the temperature comparator 18 will enable the thermal-device power switch 21 to switch on to make high-voltage power 12 available to the cooling device 22.

In even more embodiments, the central controller 1 further comprises high-voltage, thermal-device-current-sensing circuitry 3, 4, 5 in series with the high-voltage power source; an upstream high-voltage power switch 2 in series with the high-voltage power source 12 and the high-voltage, thermal-device-current-sensing circuitry 3, 4, 5; a downstream high-voltage power switch 6 in series with the high-voltage power source 12 and the high-voltage, thermal-device-current-sensing circuitry 3, 4, 5, and 10 for the at least one remote unit 15 in electrical communication with the central controller 1; low-voltage, temperature-current-sensing circuitry 8, 9, 10 in series with the low-voltage power source 13; an analog-to-digital (A/D) converter 10; and a control-logic module 11 containing embedded software to provide system management. In variations, the high-voltage, thermal-device-current-sensing circuitry 3, 4, 5, A/D converter 10, and control-logic module 11 can detect an over-current condition due to a system short circuit or other system fault, and when such over-current condition is detected, the upstream high-voltage power switch 2 is caused to open in order to stop the application of high-voltage power 12 to the at least one remote unit 15. In other variations, the time-allocation ratio between system operations in the thermal-device-powering mode 23 and temperature-sensing mode 24 of the at least one remote unit 15, as controlled by the central controller 1, can be adjusted by adjusting the timing settings within the control-logic module 11.

Other embodiments include features wherein a plurality of temperature readings in one temperature-sensing mode 24 period from the at least one remote unit 15 are averaged and adjusted for signal-filter gain in order to produce an error-reduced reading for control-logic processing. (See the example algorithms discussed in Section III.)

In further variations, the at least one remote unit 15 is enabled to act as a stand-alone thermostat during the thermal-device-powering mode 23.

In the foregoing described embodiments and variations, the control schema for the time-slicing between the heater/cooler-availability mode 23 temperature-sensing mode 24 is based on the applied voltage from the central controller 1 to a remote unit 15 exceeding a mode-threshold voltage in order to enable the powering 23 of an associated heater/cooler 22, wherein the applied voltage is at or below the mode-threshold voltage, the temperature-sensing mode 24 is entered. However, those skilled in the art would appreciate the fact that this typical operational schema can be deviated from in other applications. For example, referring to FIG. 1D, in an alternate application, each remote unit 15 is associated with a discrete instrument that may require a low-power/low-voltage (e.g., 5 W at about 5 VDC) heating capability. Such an application might be used in some spacecraft that has a plurality of small instruments and/or cameras installed in various points in and/or around the spacecraft, and each instrument/camera is in thermal communication with a low-power heating element (e.g., 5 W at about 5 VDC). In such applications, the control logic 11 in the central controller 1 and the remote unit 15 configuration is modified such that when the mode-threshold voltage drops to or below a pre-determined value (e.g., 5-10 VDC) the remote unit 15 is switched to a heater/cooler 22 availability mode 23 and conversely, when the predetermined mode-threshold voltage is exceeded, the remote unit 15 switches to a temperature-sensing mode 24.

In many embodiments, the improved thermal-control system is integrated within a spacecraft in order to take advantage of the improved thermal-control system's overall lowered mass requirements and power-consumption efficiency.

VI. A Method for Making an Improved Thermal-Control System for Temperature-Monitoring and Power Control of Thermal Devices Refer to FIGS. 1A-1C. This Section VI is generally directed to a method of making an improved thermal-control system to precisely measure temperature at one or more locations 14 remote from a central controller 1 and a means to control heater 22 and/or cooler 22 power at each remote location 14 with a temperature setpoint that is adjustable at the central-controller location, with a remote device/unit 15 connected to the central controller 1 using no more than two wires.

In an embodiment, the method comprises the steps of providing a central controller 1, comprising at least one multiplexing device 7, a low-voltage power source 13, and a high-voltage power source 12 and providing at least one remote unit 15 for installation in discrete thermal-control zones 14 remotely located from the central controller 1.

In variations, the at least one remote unit 15 is in electrical communication with the central controller 1 via at least one channel 25 of the central controller's 1 at least one multiplexing device 7, the at least one remote unit's 15 electrical communication with the central controller 1 is accomplished using no more than two wires, the at least one remote unit 15 comprises a temperature sensor 17 and a temperature-controlled constant-current source (also called a voltage-controlled current sink) 20, and the at least one remote unit 15 contains thermal-device-powering circuitry to selectively apply power to a thermal device 22. In such embodiments, the central controller 1 is adapted to selectively apply either high-voltage power 12 (in variations, between 12 VDC to at least 120 VDC) or low-voltage power 13 (in variations, 5 VDC to 8 VDC) to the at least one remote unit 15; and when the central controller 1 applies low-voltage power 13 to the at least one remote unit 15, the at least one remote unit 15 operates in temperature-sensing mode 24 and communicates a current-based temperature-reading signal to the central controller 1; and when the central controller 1 applies high-voltage power 12 (in variations, between 12 VDC to at least 120 VDC) to the at least one remote unit 15, the at least one remote unit 15 operates in thermal-device-powering mode 23 to make power available for a thermal device 22 in electrical communication with the at least one remote unit 15.

In additional embodiments, the at least one remote unit 15 operates in a temperature-sensing mode 24 when the applied voltage 13 from the central controller 1 is equal to or less than a predetermined mode-threshold voltage (in variations, this value is 10 VDC+/−1 VDC), and operates in a thermal-control-device-power-availability mode 23 when the applied voltage (in variations, 5 VDC to 8 VDC) 13 from the central controller 1 is greater than a predetermined mode-threshold voltage.

In still more embodiments, the thermal device 22 is a heater device and the method further comprises the steps of providing the at least one remote unit 15 with a temperature comparator 18, the temperature comparator 18 in communication with the temperature sensor 17 and programmed with a predetermined setpoint for an over-temperature condition; and a thermal-device power switch 21 in communication with the temperature comparator 18; wherein if the sensed temperature from the temperature sensor 17 is below the over-temperature-condition setpoint, then the temperature comparator 18 will enable the thermal-device power switch 21 to switch on to make high-voltage power 12 available to the heater device 22.

In some embodiments, the thermal device 22 is a cooling device and the method further comprises the steps of providing the at least one remote unit 15 with a temperature comparator 18, the temperature comparator 18 in communication with the temperature sensor 17 and programmed with a predetermined setpoint for an under-temperature condition; and a thermal-device power switch 21 in communication with the temperature comparator 18; wherein if the sensed temperature from the temperature sensor 17 is above the under-temperature-condition setpoint, then the temperature comparator 18 will enable the thermal-device power switch 21 to switch on to make high-voltage power 12 available to the cooling device 22.

In even more embodiments, the method further comprises the steps of providing the central controller 1 with high-voltage, thermal-device-current-sensing circuitry 3, 4, 5 in series with the high-voltage power source; an upstream high-voltage power switch 2 in series with the high-voltage power source 12 and the high-voltage, thermal-device-current-sensing circuitry 3, 4, 5; a downstream high-voltage power switch 6 in series with the high-voltage power source 12 and the high-voltage, thermal-device-current-sensing circuitry 3, 4, 5, and 10 for the at least one remote unit 15 in electrical communication with the central controller 1; low-voltage, temperature-current-sensing circuitry 8, 9, 10 in series with the low-voltage power source 13; an analog-to-digital (A/D) converter 10; and a control-logic module 11 containing embedded software to provide system management. In variations, the high-voltage, thermal-device-current-sensing circuitry 3, 4, 5, A/D converter 10, and control-logic module 11 can detect an over-current condition due to a system short circuit or other system fault, and when such over-current condition is detected, the upstream high-voltage power switch 2 is caused to open in order to stop the application of high-voltage power 12 to the at least one remote unit 15. In other variations, the time-allocation ratio between system operations in the thermal-device-powering mode 23 and temperature-sensing mode 24 of the at least one remote unit 15, as controlled by the central controller 1, can be adjusted by adjusting the timing settings within the control-logic module 11.

Other embodiments include features wherein a plurality of temperature readings in one temperature-sensing mode 24 period from the at least one remote unit 15 are averaged and adjusted for signal-filter gain in order to produce an error-reduced reading for control-logic processing. (See the example algorithms discussed in Section III.)

In more variations, the method further comprises the step of enabling the at least one remote unit 15 is to act as a stand-alone thermostat during the thermal-device-powering mode 23.

In the foregoing described embodiments and variations, the control schema for the time-slicing between the heater/cooler-availability mode 23 temperature-sensing mode 24 is based on the applied voltage from the central controller 1 to a remote unit 15 exceeding a mode-threshold voltage in order to enable the powering 23 of an associated heater/cooler 22, wherein the applied voltage is at or below the mode-threshold voltage, the temperature-sensing mode 24 is entered. However, those skilled in the art would appreciate the fact that this typical operational schema can be deviated from in other applications. For example, referring to FIG. 1D, in an alternate application, each remote unit 15 is associated with a discrete instrument that may require a low-power/low-voltage (e.g., 5 W at about 5 VDC) heating capability. Such an application might be used in some spacecraft that has a plurality of small instruments and/or cameras installed in various points in and/or around the spacecraft, and each instrument/camera is in thermal communication with a low-power heating element (e.g., 5 W at about 5 VDC). In such applications, the control logic 11 in the central controller 1 and the remote unit 15 configuration is modified such that when the mode-threshold voltage drops to or below a pre-determined value (e.g., 5-10 VDC) the remote unit 15 is switched to a heater/cooler 22 availability mode 23 and conversely, when the predetermined mode-threshold voltage is exceeded, the remote unit 15 switches to a temperature-sensing mode 24.

In many embodiments, the method further comprises the step of integrating the improved thermal-control system within a spacecraft in order to take advantage of the improved thermal-control system's overall lowered mass requirements and power-consumption efficiency.

VII. A Method for Using an Improved Thermal-Control System for Temperature-Monitoring and Power Control of Thermal Devices Refer to FIGS. 1A-1C. This Section VII is generally directed to a method of using an improved thermal-control system to precisely measure temperature at one or more locations 14 remote from a central controller 1 and a means to control heater 22 and/or cooler 22 power at each remote location 14 with a temperature setpoint that is adjustable at the central-controller location, with a remote device/unit 15 connected to the central controller 1 using no more than two wires, or any of the embodiment described in Sections III, IV, and/r V, supra.

In an embodiment, the method comprises the steps of:
Identifying and obtaining a host system for an improved thermal-control system as described in Sections III, IV, and/or V, supra;
Identifying the number and location of discrete thermal zones 14 to monitor within said host system;
Installing the improved thermal-control system in the host system, with a remote unit 15 disposed at each previously identified thermal zone 14 to monitor, including an associated thermal device 22 within proximity of the remote unit 15 such that the thermal device 22 is within thermal communication with the temperature sensor 17 of the remote unit 15; and
Energizing the improved thermal-control system.

In some variations, the method further comprises the steps of:
Determining the needed system-operation-mode-timing settings for the improved thermal-control system; and
Adjusting the system-operation-mode-timing settings in the central controller 1 according to that determination.

In other variations, the method further comprises the steps of:
Selecting which, if any, remote units 15 should be used as a stand-alone thermostat; and
Enabling the selected remote units 15 to operate as stand-alone thermostats.

VIII. Alternative Embodiments and Other Variations

The various embodiments and variations thereof described herein or in the appended Claims and/or illustrated in the accompanying Figures are merely exemplary and are not meant to limit the scope of the inventive disclosure. It should be appreciated that numerous variations of the invention have been contemplated as would be obvious to one of ordinary skill in the art with the benefit of this disclosure.

Hence, those ordinarily skilled in the art will have no difficulty devising myriad obvious variations and improvements to the invention, all of which are intended to be encompassed within the scope of the Description, Figures, and Claims herein

What is claimed is:

1. An improved thermal-control system for temperature-monitoring and power-control of one or more thermal devices, comprising:
 a central controller, comprising at least one multiplexing device, a low-voltage power source, and a high-voltage power source; and
 at least one remote unit for installation in discrete thermal-control zones remotely located from said central controller, wherein:
  said at least one remote unit is in electrical communication with said central controller via at least one channel of said central controller's at least one multiplexing device,
  said at least one remote unit's electrical communication with said central controller is accomplished using no more than two wires,
  said at least one remote unit comprises a temperature sensor and a temperature-controlled constant-current source, and
  said at least one remote unit contains thermal-device-powering circuitry to selectively apply power to a thermal device;
 wherein:
  said central controller is adapted to selectively apply either said high-voltage power or low-voltage power to said at least one remote unit, the ratio of time between said high-voltage-power and low-voltage-power applications being based on allowing enough time for said low-voltage power to allow said remote unit temperature sensor to provide an accurate temperature reading,
  when said central controller applies low-voltage power to said at least one remote unit, said at least one remote unit operates in temperature-sensing mode and communicates a current-based temperature-reading signal to said central controller,
  when said central controller applies high-voltage power to said at least one remote unit, said at least one remote unit operates in thermal-device-powering mode to make power available for a thermal device in electrical communication with said at least one remote unit, and
  said at least one remote unit operates in a temperature-sensing mode when said applied voltage from said central controller is equal to or less than a predetermined mode-threshold voltage, and operates in a thermal-control-device-power-availability mode when said applied voltage from said central controller is greater than a predetermined mode-threshold voltage.

2. The improved thermal-control system of claim 1, wherein said mode-threshold voltage is set at 10 VDC.

3. The improved thermal-control system of claim 1, wherein said mode-threshold voltage is set at 9-11 VDC.

4. The improved thermal-control system of claim 1, wherein said high-voltage power is at a voltage of 12 VDC to 120 VDC.

5. The improved thermal-control system of claim 1, wherein said low-voltage power is at a voltage of 5 VDC to 8 VDC.

6. The improved thermal-control system of claim 1, wherein said thermal device is a heater device and said at least one remote unit further comprises:
 a temperature comparator, said temperature comparator in communication with said temperature sensor and programmed with a predetermined setpoint for an over-temperature condition; and
 a thermal-device power switch in communication with said temperature comparator;
 wherein if the sensed temperature from said temperature sensor is below said over-temperature-condition setpoint, then said temperature comparator will enable said thermal-device power switch to switch on to make high-voltage power available to said heater device.

7. The improved thermal-control system of claim 1, wherein said thermal device is a cooling device and said at least one remote unit further comprises:
 a temperature comparator, said temperature comparator in communication with said temperature sensor and programmed with a predetermined setpoint for an under-temperature condition; and
 a thermal-device power switch in communication with said temperature comparator;
 wherein if the sensed temperature from said temperature sensor is above said under-temperature-condition setpoint, then said temperature comparator will enable said thermal-device power switch to switch on to make high-voltage power available to said cooling device.

8. The improved thermal-control system of claim 1, wherein said central controller further comprises:
 high-voltage, thermal-device-current-sensing circuitry in series with said high-voltage power source;
 an upstream high-voltage power switch in series with said high-voltage power source and said high-voltage, thermal-device-current-sensing circuitry;
 a downstream high-voltage power switch in series with said high-voltage power source and said high-voltage, thermal-device-current-sensing circuitry for said at least one remote unit in electrical communication with said central controller;
 low-voltage, temperature-current-sensing circuitry in series with said low-voltage power source;
 an analog-to-digital (A/D) converter; and
 a control-logic module containing embedded software to provide system management.

9. The improved thermal-control system of claim 8, wherein said high-voltage, thermal-device-current-sensing circuitry, A/D converter, and control-logic module can detect an over-current condition due to a system short circuit or other system fault, and when such over-current condition is detected, said upstream high-voltage power switch is caused to open in order to stop the application of high-voltage power to said at least one remote unit.

10. The improved thermal-control system of claim 8, wherein the time-allocation ratio between system operations in said thermal-device-powering mode and temperature-sensing mode of said at least one remote unit, as controlled by said central controller, can be adjusted by adjusting the timing settings within said control-logic module.

11. The improved thermal-control system of claim 8, wherein a plurality of temperature readings in one temperature-sensing mode period from said at least one remote unit are averaged and adjusted for signal-filter gain in order to produce an error-reduced reading for control-logic processing.

12. The improved thermal-control system of claim 6, wherein said at least one remote unit is enabled to act as a stand-alone thermostat during said thermal-device-powering mode.

13. The improved thermal-control system of claim 1, wherein said improved thermal-control system is integrated within a spacecraft.

14. The improved thermal-control system of claim 8, wherein said improved thermal-control system is integrated within a spacecraft.

15. The improved thermal-control system of claim 9, wherein said improved thermal-control system is integrated within a spacecraft.

16. The improved thermal-control system of claim 10, wherein said improved thermal-control system is integrated within a spacecraft.

17. The improved thermal-control system of claim 11, wherein said improved thermal-control system is integrated within a spacecraft.

18. The improved thermal-control system of claim 12, wherein said improved thermal-control system is integrated within a spacecraft.

19. A method of making an improved thermal-control system for temperature-monitoring and power-control of one or more thermal devices, the method comprising the steps of:
   providing a central controller, comprising at least one multiplexing device, a low-voltage power source, and a high-voltage power source; and
   providing at least one remote unit for installation in discrete thermal-control zones remotely located from said central controller, wherein:
      said at least one remote unit is in electrical communication with said central controller via at least one channel of said central controller's at least one multiplexing device,
      said at least one remote unit's electrical communication with said central controller is accomplished using no more than two wires,
      said at least one remote unit comprises a temperature sensor and a temperature-controlled constant-current source, and
      said at least one remote unit contains thermal-device-powering circuitry to selectively apply power to a thermal device;
   wherein:
      said central controller is adapted to selectively apply either said high-voltage power or low-voltage power to said at least one remote unit, the ratio of time between said high-voltage-power and low-voltage-power applications being based on allowing enough time for said low-voltage power to allow said remote unit temperature sensor to provide an accurate temperature reading,
      when said central controller applies low-voltage power to said at least one remote unit, said at least one remote unit operates in temperature-sensing mode and communicates a current-based temperature-reading signal to said central controller,
      when said central controller applies high-voltage power to said at least one remote unit, said at least one remote unit operates in thermal-device-powering mode to make power available for a thermal device in electrical communication with said at least one remote unit, and
      said at least one remote unit operates in a temperature-sensing mode when said applied voltage from said central controller is equal to or less than a predetermined mode-threshold voltage, and operates in a thermal-control-device-power-availability mode when said applied voltage from said central controller is greater than a predetermined mode-threshold voltage.

20. The method of claim 19, wherein said mode-threshold voltage is set at 10 VDC.

21. The method of claim 19, wherein said mode-threshold voltage is set at 9-11 VDC.

22. The method of claim 19, wherein said high-voltage power is at a voltage of 12 VDC to 120 VDC.

23. The method of claim 19, wherein said low-voltage power is at a voltage of 5 VDC to 8 VDC.

24. The method of claim 19, wherein said thermal device is a heater device and the method further comprises the steps of providing said at least one remote unit with:
   a temperature comparator, said temperature comparator in communication with said temperature sensor and programmed with a predetermined setpoint for an over-temperature condition; and
   a thermal-device power switch in communication with said temperature comparator;
   wherein if the sensed temperature from said temperature sensor is below said over-temperature-condition setpoint, then said temperature comparator will enable said thermal-device power switch to switch on to make high-voltage power available to said heater device.

25. The method of claim 19, wherein said thermal device is a cooling device and the method further comprises the steps of providing said at least one remote unit with:
   a temperature comparator, said temperature comparator in communication with said temperature sensor and programmed with a predetermined setpoint for an under-temperature condition;
   a thermal-device power switch in communication with said temperature comparator;
   wherein if the sensed temperature from said temperature sensor is above said under-temperature-condition setpoint, then said temperature comparator will enable said thermal-device power switch to switch on to make high-voltage power available to said cooling device.

26. The method of claim 19, the method further comprises the steps of providing said central controller with:
   high-voltage, thermal-device-current-sensing circuitry in series with said high-voltage power source;
   an upstream high-voltage power switch in series with said high-voltage power source and said high-voltage, thermal-device-current-sensing circuitry;
   a downstream high-voltage power switch in series with said high-voltage power source and said high-voltage, thermal-device-current-sensing circuitry for said at least one remote unit in electrical communication with said central controller;
   low-voltage, temperature-current-sensing circuitry in series with said low-voltage power source;
   an analog-to-digital (A/D) converter; and
   a control-logic module containing embedded software to provide system management.

27. The method of claim 26, wherein said high-voltage, thermal-device-current-sensing circuitry, A/D converter, and control-logic module can detect an over-current condition due to a system short circuit or other system fault, and when such over-current condition is detected, said upstream high-voltage power switch is caused to open in order to stop the application of high-voltage power to said at least one remote unit.

28. The method of claim 26, wherein the time-allocation ratio between system operations in said thermal-device-powering mode and temperature-sensing mode of said at least one remote unit, as controlled by said central controller, can be adjusted by adjusting the timing settings within said control-logic module.

29. The method of claim 26, wherein a plurality of temperature readings in one temperature-sensing mode period from said at least one remote unit are averaged and adjusted for signal-filter gain in order to produce an error-reduced reading for control-logic processing.

30. The method of claim 24, wherein the method further comprises the step of enabling said at least one remote unit to act as a stand-alone thermostat during said thermal-device-powering mode.

31. The method of claim 19, wherein the method further comprises the step of integrating said improved thermal-control system a spacecraft.

32. The method of claim 26, wherein the method further comprises the step of integrating said improved thermal-control system a spacecraft.

33. The method of claim 27, wherein the method further comprises the step of integrating said improved thermal-control system a spacecraft.

34. The method of claim 28, wherein the method further comprises the step of integrating said improved thermal-control system a spacecraft.

35. The method of claim 29, wherein the method further comprises the step of integrating said improved thermal-control system a spacecraft.

36. The method of claim 30, wherein the method further comprises the step of integrating said improved thermal-control system a spacecraft.

37. A method of using an improved thermal-control system for temperature-monitoring and power-control of one or more thermal devices, wherein said improved thermal-control system comprises:
   a central controller, comprising at least one multiplexing device, a low-voltage power source, and a high-voltage power source; and
   at least one remote unit for installation in discrete thermal-control zones remotely located from said central controller, wherein:
      said at least one remote unit is in electrical communication with said central controller via at least one channel of said central controller's at least one multiplexing device,
      said at least one remote unit's electrical communication with said central controller is accomplished using no more than two wires,
      said at least one remote unit comprises a temperature sensor and a temperature-controlled constant-current source, and
      said at least one remote unit contains thermal-device-powering circuitry to selectively apply power to a thermal device;
   wherein:
      said central controller is adapted to selectively apply either said high-voltage power or low-voltage power to said at least one remote unit, the ratio of time between said high-voltage-power and low-voltage-power applications being based on allowing enough time for said low-voltage power to allow said remote unit temperature sensor to provide an accurate temperature reading, and
      when said central controller applies low-voltage power to said at least one remote unit, said at least one remote unit operates in temperature-sensing mode and communicates a current-based temperature-reading signal to said central controller,
      when said central controller applies high-voltage power to said at least one remote unit, said at least one remote unit operates in thermal-device-powering mode to make power available for a thermal device in electrical communication with said at least one remote unit, and
      said at least one remote unit operates in a temperature-sensing mode when said applied voltage from said central controller is equal to or less than a predetermined mode-threshold voltage, and operates in a thermal-control-device-power-availability mode when said applied voltage from said central controller is greater than a predetermined mode-threshold voltage;
   the method comprising the steps of:
      identifying and obtaining a host system for said improved thermal-control system;
      identifying the number and location of discrete thermal zones to monitor within said host system;
      installing said improved thermal-control system in said host system, with a remote unit disposed at each previously identified thermal zone to monitor, including an associated thermal device within proximity of said remote unit such that said thermal device is within thermal communication with the temperature sensor of said remote unit; and
      energizing said improved thermal-control system.

38. The method of claim 37, wherein said mode-threshold voltage is set at 10 VDC.

39. The method of claim 37, wherein said mode-threshold voltage is set at 9-11 VDC.

40. The method of claim 37, wherein said high-voltage power is at a voltage of 12 VDC to 120 VDC.

41. The method of claim 37, wherein said low-voltage power is at a voltage of 5 VDC to 8 VDC.

42. The method of claim 37, wherein said thermal device is a heater device and said at least one remote unit further comprises:
   a temperature comparator, said temperature comparator in communication with said temperature sensor and programmed with a predetermined setpoint for an over-temperature condition; and
   a thermal-device power switch in communication with said temperature comparator;
   wherein if the sensed temperature from said temperature sensor is below said over-temperature-condition setpoint, then said temperature comparator will enable said thermal-device power switch to switch on to make high-voltage power available to said heater device.

43. The method of claim 37, wherein said thermal device is a cooling device and said at least one remote unit further comprises:
   a temperature comparator, said temperature comparator in communication with said temperature sensor and programmed with a predetermined setpoint for an under-temperature condition; and
   a thermal-device power switch in communication with said temperature comparator;

wherein if the sensed temperature from said temperature sensor is above said under-temperature-condition setpoint, then said temperature comparator will enable said thermal-device power switch to switch on to make high-voltage power available to said cooling device.

44. The method of claim 37, wherein said central controller further comprises:
high-voltage, thermal-device-current-sensing circuitry in series with said high-voltage power source;
an upstream high-voltage power switch in series with said high-voltage power source and said high-voltage, thermal-device-current-sensing circuitry;
a downstream high-voltage power switch in series with said high-voltage power source and said high-voltage, thermal-device-current-sensing circuitry for said at least one remote unit in electrical communication with said central controller;
low-voltage, temperature-current-sensing circuitry in series with said low-voltage power source;
an analog-to-digital (A/D) converter; and
a control-logic module containing embedded software to provide system management.

45. The method of claim 44, wherein said high-voltage, thermal-device-current-sensing circuitry, A/D converter, and control-logic module can detect an over-current condition due to a system short circuit or other system fault, and when such over-current condition is detected, said upstream high-voltage power switch is caused to open in order to stop the application of high-voltage power to said at least one remote unit.

46. The method of claim 44, wherein the time-allocation ratio between system operations in said thermal-device-powering mode and temperature-sensing mode of said at least one remote unit, as controlled by said central controller, can be adjusted by adjusting the timing settings within said control-logic module, the method further comprising the steps of:
determining the needed system-operation-mode-timing settings for the improved thermal-control system; and
adjusting said system-operation-mode-timing settings according to said determination.

47. The method of claim 44, wherein a plurality of temperature readings in one temperature-sensing mode period from said at least one remote unit are averaged and adjusted for signal-filter gain in order to produce an error-reduced reading for control-logic processing.

48. The method of claim 42, wherein said at least one remote unit is enabled to act as a stand-alone thermostat during said thermal-device-powering mode, the method further comprising the steps of:
selecting which, if any, remote units should be used as a stand-alone thermostat; and
enabling said selected remote units to operate as stand-alone thermostats.

49. The method of claim 37, wherein said host system is a spacecraft.

50. The method of claim 44, wherein said host system is a spacecraft.

51. The method of claim 45, wherein said host system is a spacecraft.

52. The method of claim 46, wherein said host system is a spacecraft.

53. The method of claim 47, wherein said host system is a spacecraft.

54. The method of claim 48, wherein said host system is a spacecraft.

* * * * *